2,902,755
METHOD OF MAKING BRAZING MATERIAL

Albert Edward Salt, Edgbaston, and Edwin Albert Taylor, Birmingham, England, assignors to Imperial Chemical Industries Limited, London, England, a corporation of Great Britain No Drawing. Application March 23, 1956
Serial No. 573,338

Claims priority, application Great Britain March 30, 1955

3 Claims. (Cl. 29—420)

This invention relates to improvements in joining titanium or titanium base alloy articles and more particularly to improved brazing materials for use in the brazing of the said metal or alloys and their fabrication into forms suitable for use in the brazing operation. The invention has still more particular reference to the furnace brazing of titanium or its alloys in an inert atmosphere.

In the furnace brazing of small components, where short heating and cooling cycles are practicable, pure silver may be used as the brazing material, but with larger components the brazing cycles are increased and the resultant joints are poor when silver is employed. We have found that by the use of certain titanium base alloys as brazing material improved results may be obtained.

According to one feature of the invention therefore, we provide a method of brazing titanium or titanium base alloy articles which comprises employing as brazing material an alloy based on a mixture of titanium with another element or elements so chosen that the said brazing alloy is eutectiferous.

Many of these alloys are however difficult, if not impossible, to fabricate by normal techniques, such as rolling down from slab or ingot form. Alternative methods of production of the alloy in form suitable for use in brazing operations include the preparation of powder by subdivision of an alloy of suitable composition in massive form, and mixing of the separate components in powder form with subsequent reliance upon the diffusion effects which occur during the brazing cycle to effect homogeneity. In both these methods however, whilst such powder alloys could be used for making simple butt or lap joints, some form of binding agent for the powder would be required when making complex assemblies and the principal difficulty is then the choice of a suitable binding agent which would not itself contaminate the titanium at the brazing temperature.

According to another feature of the invention, we provide a method of brazing titanium or titanium base alloys which comprises employing as brazing material a mixture of titanium and another element or elements capable of combining with the titanium during the brazing operation to form in situ a eutectiferous alloy. Elements which form eutectiferous alloys with titanium include the metals copper, iron, manganese, nickel, silicon, and cobalt, and mixtures of titanium with such metals in proportions appropriate to the production of suitable binary, ternary or other systems, may be employed for the purposes of the invention.

The ingredients selected to form the braizng material may be physically associated in any one of several ways according to the form in which they are required. Thus where the brazing material is required in the form of foil, it may be so produced by rolling an intimate mixture of the several powdered ingredients. Alternatively, where the brazing material is required in rod form and one of the ingredients is sufficiently ductile, it may be fabricated in the form of a tube of the ductile ingredient packed with the other ingredient or ingredients in powdered form. The tube may then be reduced by rolling, drawing, swaging, or other suitable means to consolidate the powder.

It is essential that the wall thickness of the tube should be such as to provide the required proportion of that alloying ingredient from which the tube is made. A tube having such a wall thickness may, however, be unable to withstand the reducing operation, and it would then be necessary to use a tube of greater wall thickness than required, thereby increasing the proportion of that particular alloying constituent. The procedure in such a case would be to pickle the filled tube after the reducing operation to remove excess of material forming the tube. This is preferably carried out by the electropickling process in which conditions for the removal of the correct amount of metal can be accurately controlled.

Sufficient diffusion takes place during the brazing operation to ensure the formation of a good alloy joint.

If very thin gauge foil is required it may be necessary to sinter the rolled material in an inert atmosphere, e.g. argon, and then re-roll.

*Example 1.*—62 parts of titanium powder, 28 parts of nickel powder and 10 parts of copper powder (parts being by weight) were mixed and the mixture rolled in known manner to form a foil about 0.010–0.012 inch thick. Sections of foil were interposed between the component parts requiring to be bonded of a titanium heat exchanger matrix and the assembly furnace-brazed in argon. The melting point of the ternary brazing alloy is about 960° C.

*Example 2.*—In order to make a welding rod of the composition 62% titanium, 28% nickel, and 10% copper, a nickel tube of 0.5″ outside diameter and with a wall thickness of 0.010″ was selected to form the container for the other ingredients. An intimate mixture of titanium and copper powders, both sieved through 100 mesh, was prepared, the portions of the constituents being calculated from the ratio, $$\frac{\text{parts by weight of copper} \times 100}{(\text{parts by weight of titanium} + \text{parts by weight of copper})}$$

$$=\frac{10 \times 100}{10+62}=13.9\% \text{ copper}$$

The powder mixture consisting of 13.9% copper and 86.1% titanium was then packed into the nickel tube and the tube drawn down in a number of passes to a diameter of 0.2″ and finally swaged to a diameter of 0.12″.

Other alloys suitable for the purposes of the invention comprise the binary systems shown in Table I.

*Table I*

| Alloy Composition (parts by wt.) | | | | Melting point, ° C. |
|---|---|---|---|---|
| Titanium | Copper | Nickel | Cobalt | |
| 72 |  | 28 |  | 960–980 |
| 60 | 40 |  |  | 1,000–1,020 |
| 72 |  |  | 28 | 1,025 |

By a suitable choice of brazing alloy compositions it is possible to perform two or more successive brazing operations on the same work-piece, each brazing operation being conducted at a lower temperature than the preceding one.

Tensile tests on titanium brazed with the material described herein have indicated that the strength of the brazed joint is greater than that of the titanium.

We claim:

1. The method of making a brazing material having substantially the composition of 62% titanium, 28% nickel and 10% copper, for brazing titanium and titanium alloys comprising the steps of packing a nickel tube having a weight of 28 parts with 72 parts of a mixture of titanium and copper powders, said mixture consisting essentially of 86.1% titanium and 13.9% copper, and then reducing said tube to consolidate the powder.

2. The method of claim 1 wherein the initial nickel tube has an outside diameter of .5 inch and a wall thickness of .010 inch.

3. The method of claim 2 wherein the packed tube is drawn down to a diameter of .2″ and swaged to a diameter of .12″.

References Cited in the file of this patent

UNITED STATES PATENTS

| | | |
|---|---|---|
| 2,362,893 | Durst | Nov. 14, 1944 |
| 2,739,375 | Coxe | Mar. 27, 1956 |
| 2,741,932 | Whitney et al. | Apr. 17, 1956 |
| 2,763,052 | Elmer | Sept. 18, 1956 |
| 2,822,269 | Long | Feb. 4, 1958 |

OTHER REFERENCES

WADC Technical Report 52–313, part 1, pages 29 and 30, Battelle Memorial Institute, November 1952.